INVENTORS
DAVID B. PORTER
RICHARD A. PAINE

Aug. 3, 1965   D. B. PORTER ETAL   3,198,865
METHOD OF APPLYING A MICROPOROUS PLASTIC
MEMBRANE FILTER ON A SUPPORT
Filed Sept. 28, 1960   2 Sheets-Sheet 2

INVENTORS
DAVID B. PORTER
RICHARD A. PAINE
BY
Kenway, Jenney + Hildreth
ATTORNEYS United States Patent Office 3,198,865
Patented Aug. 3, 1965

3,198,865
METHOD OF APPLYING A MICROPOROUS PLASTIC MEMBRANE FILTER ON A SUPPORT
David B. Porter, Watertown, and Richard A. Paine, Bedford, Mass., assignors to Millipore Filter Corporation, Bedford, Mass., a corporation of Massachusetts
Filed Sept. 28, 1960, Ser. No. 59,114
3 Claims. (Cl. 264—271)

This invention relates to the filtration of fluids, and has for its object the provision of a method of forming a microporous plastic membrane filter over a perforated tubular support.

The invention comprises the application of a thin solid coating of a base material on the outer surface of the support and over the perforations, the application of a plastic film-forming solution over the base material, the conversion of the solution to a microporous plastic membrane filter, and removing the base material leaving the membrane filter loosely overlying the support.

A filter capable of removing microscopic particles from a fluid under pressure and at high rates of flow is useful in many applications, such as oil or fuel filtering in aircraft. However, a filter which possesses both the requisites of a sufficiently large number of pores of micron size for filtration at a high rate of flow, and sufficient strength to withstand high pressure differentials has not heretofore been commonly available.

Materials having sufficiently small pores in such substantial numbers as to give an acceptable permeability are the flexible microporous plastic filter films of the type described by Zsigmondy in U.S. Patent 1,421,341; by P. Grabar and J. A. De Loureiro in Annales de L'Institute Pasteur, 65, 159–189 (1939); and by Lovell and Bush in application Serial No. 496,618 filed March 24, 1955, now Patent Number 2,783,894. These materials are microporous plastics, having pores of effective diameter less than about ten microns in a number occupying more than 80 percent of the total volume of the plastic material.

These materials are not strong, however, and in order to support such plastic filter films against a substantial pressure differential exerted by a fluid being filtered, it is necessary to back up the plastic film with a reinforcing material which is not only of adequate strength, but which will not unduly impair the filtering action of the film. Accordingly, the reinforcing material is desirably perforated with interstitial openings which are spanned by the filtering film. These openings or perforations should be of sufficient area to permit a maximum rate of filtration without being so large as to permit the spanning film to fail under the fluid pressure, by rupturing or cracking.

The present invention is based upon the discovery that a plastic filtering film which is disposed peripherally about a rigid tube of perforated or otherwise porous reinforcing material in a loosely overlying relationship receives adequate reinforcement from the tube, and yet is capable of filtering fluid over effectively its entire surface area. The term "loosely overlying" is used in the sense that the film does not adhere to the tube, although there may be mutual contact. The phenomenon is believed to occur through lateral flow in the minute space between the plastic filter film and the tube, so that portions of the film overlying solid areas of the tube pass fluid as well as those portions overlying perforations. By the use of this invention, it is possible to achieve filtration over substantially the entire area of the film when combined with a supporting tube having perforations covering only about 25 percent of the surface area of the tube. It is thus possible to achieve more effective reinforcement of the plastic film, with the result that the filter cartridge of the invention may be subjected to greater pressure differentials than have hitherto been feasible.

According to the improved method of manufacture of this invention, a perforated tube of a relatively rigid material is first coated with a material to form a thin base coating on the outer surface of the tube and to fill the perforations. Typically, the tube is dipped into molten paraffin which is then allowed to solidify as a thin film covering the outer surface and filling the perforations. A film of paraffin will also be formed over the inner surface of the tube, but this is not necessary to the carrying out of the invention. Instead of paraffin, the coating may be formed of any material which will provide a similar surface coating and may then be removed by dissolving, melting or evaporating it away. A solution of plastic suitable for forming the microporous filter film is then cast over the paraffin coating and caused to harden into the filter film by a well-known process, such as described by the aforementioned patent to Zsigmondy. The paraffin coating is then removed, as by dissolving it in a solvent, or by heating the cartridge to a suitable temperature to melt the paraffin. In the resulting filter, the plastic film receives the tube with some looseness and does not adhere thereto, although it need not be readily removable from the tube. This spacing appears to permit longitudinal flow to take place between the tube and the filter, so that the entire area of the film is active in filtering fluid. The fluid is supplied to the external surface of the cartridge under a substantial pressure which will ordinarily exceed 10 p.s.i., and is filtered through the microporous film and subsequently through the perforated tube into the interior of the tube to an outlet at an end of the tube.

In a novel filter cartridge which forms another feature of this invention, a plurality of the filter tubes are assembled in parallel spaced-apart relation within an end cap at one end of the tubes and within a discharge conduit member at the opposite end of the tubes. A plastic resin potting compound is deposited about the exterior peripheries of the ends of the tubes to seal them against fluid communication within the end cap and the conduit member. Communication between the interior and exterior surfaces of the tubes is thus established only through the plastic filtering film. The assembly is adapted to be inserted within a pressure vessel to which a fluid to be filtered is supplied under a suitable pressure. The filtered fluid is withdrawn through the conduit member.

While the specification concludes with claims particularly pointing out the subject matter of the invention, it is believed that the invention will be more clearly understood from the following detailed description of the preferred embodiments thereof, referring to the accompanying drawings, in which:

Figure 1:
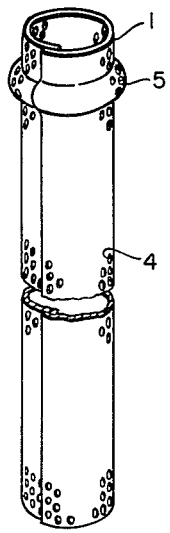
FIG. 1 is a pictorial view of a tube member forming one element of the filter.

Referring to FIGS. 1–5, the progressive steps in forming a filter according to the method of the invention are shown. The filter is formed over a rigid supporting tube 1 of metal or other relatively rigid material having the necessary strength, over which is applied a base coating of paraffin or other suitable material.

The tube may be rolled, as shown, from a previously perforated sheet, or the perforations 4 may be formed after the tube is formed. An enlarged flange 5 or similar configuration is conveniently provided near at least one end of the tube to facilitate subsequent sealing within a fluid discharge conduit member or a cap member. The perforations 4 are of sufficient transverse dimension to permit a maximum rate of flow into the interior of the tube from the filtering film while providing adequate support to prevent rupturing or cracking of the film, which overlies the perforations. Because of the utilization for filtering of substantially the full area of the plastic film which is achieved by the filter of this invention, the perforations 4 may occupy as little as about 25 percent of the surface area of the tube.

In practice, it has been found that the base coating should be thinner than about 1 mm. as measured radially outwardly from the tube. The perforated tube is dipped in the base material, which may be molten paraffin, to form a coating about the outer periphery of the tube, and filling the perforations 4. The dipping step will also form a coating over the interior surface of the tube; however, this is not necessary in carrying out the invention, and other methods of forming a coating of desired thickness, such as spraying, may be used even though the interior surface of the tube is not coated thereby. The coating is formed to a thickness of not more than 1 mm., the actual thickness being selected according to the desired spacing between the plastic film and the tube in the resulting filter. The spacing should be sufficient to permit flow to take place between the film and the tube when the film is subjected to external fluid pressure in operation, which tends to bring the film into contact with the periphery with the tube. At the same time, the spacing must not be so great as to permit the film to become substantially wrinkled so as to induce cracking or rupturing thereof, or so loose as to be readily slidable along the tube.

Subsequent to its deposition on the tube, the paraffin coating is permitted to solidify. A thin flexible film of microporous plastic material 3 is then deposited about the periphery of the paraffin coating to overlie those perforations 4 which lie along the portion of the tube below the flange 5.

The plastic film should be at least 50 microns in thickness, to afford sufficient strength to prevent pressing of the subsequently formed solid film through the perforations 4 by fluid pressure applied in operation of the filter, and consequent rupture of the film. It is desirable to form a film of somewhat greater thickness than the minimum, preferably in the range of 100 to 140 microns.

Figure 3:
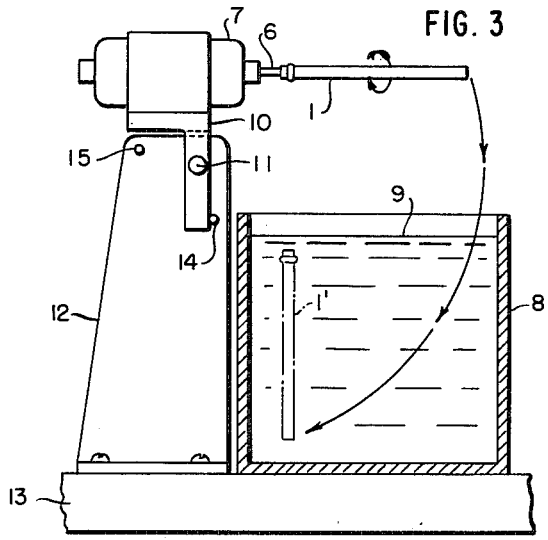
FIG. 3 is a view in elevation of an apparatus for carrying on a further step in the preparation of the filter.
Figure 2:
FIG. 2 is a fragmentary view in cross section of the tube showing a paraffin film deposited thereon according to the method of the invention.
Figure 4:
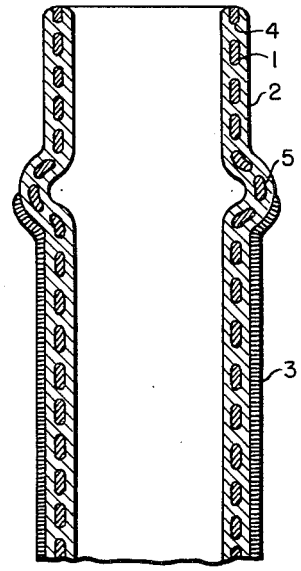
FIG. 4 is a view similar to FIG. 2, but showing a plastic film formed about the tube.

The preferred method of applying the base coating and filter film is shown in FIG. 3. The tube is mounted on the shaft 6 of a motor 7, which is arranged to be tipped downwardly as shown by the arrows to extend the tube into a reservoir 8 containing a liquid base material or plastic film-forming solution 9. To this end, the motor 7 is mounted in a bracket 10 pivoted at 11 upon a stand 12, which is in turn supported by a suitable base 13. Pivoting movement of the bracket 10 is limited by means of stop pins 14 and 15 to the horizontal and vertical positions. After the motor is started, the assembly is pivoted vertically to extend the tube into the reservoir 8 as shown at 11, and is then pivoted to raise the tube to the horizontal position shown in solid lines. Rotation of the tube is continued in order to distribute the coating material in a layer 3 of desired thickness until the coating has hardened. The rate of rotation is selected with reference to the viscosity of the film, such that a uniform film is formed.

The tube is then removed from the shaft 6 and is humidified and dried to convert the liquid film to a solid microporous structure, as described in the previously mentioned patent to Zsigmondy. The resulting filter film may be capable of removing particles as small as 1/100,000 mm., which corresponds to an effective pore size of about 10 millimicrons. Although this description is made with specific reference to the cellulose ester films of the type described by Zsigmondy, other solutions of film-forming materials and treatments for processing them into microporous solid structures, such as are well-known in the art, may be used with entirely satisfactory results.

Figure 5:
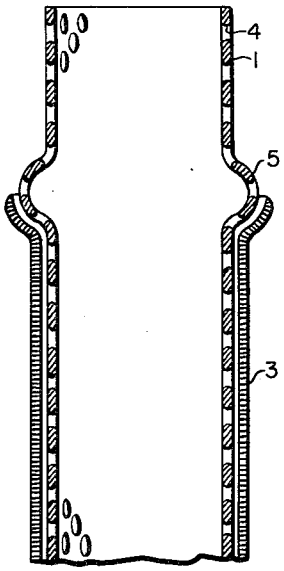
FIG. 5 is a view similar to FIG. 4, but showing the filter assembly after the paraffin coating has been dissolved and removed.

Subsequent to conversion of the liquid into a solid microporous plastic film, the paraffin coating 2 is removed conveniently by dissolving it in xylene, or other suitable solvent, leaving the plastic film 3 peripherally spaced about the tube 1 as shown in FIG. 5. The film loosely overlies the tube, that is to say, it does not adhere to the tube, although it may not be readily removed and may be in surface contact with it. The resulting filter is utilized by supplying the fluid to be filtered under a substantial pressure to the exterior surface of the film 3, and providing conduit means to drain the filtered fluid from at least one of the ends of the tube 1. The filter has been found in practice to withstand fluid pressures up to at least 150 pounds per square inch.

Figure 6:
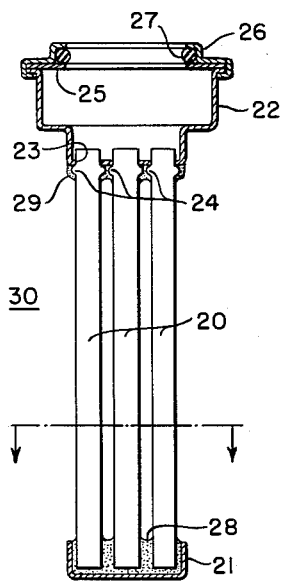
FIG. 6 is a sectional view in elevation of the filter cartridge assembly embodying a further feature of the invention.
Figure 7:
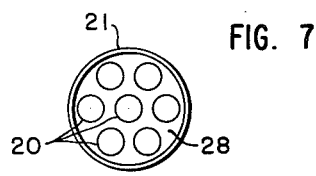
FIG. 7 is an end view of the assembly of FIG. 6.

A structure in which a plurality of the filters are utilized to form a filter cartridge is shown in FIGS. 6 and 7. The tubes are located in parallel spaced-apart relation within a cap member 21 at first ones of the ends thereof, and a discharge conduit member 22 at the other ends thereof. The tubes are received within a plurality of suitable spaced openings 23 formed in the member 22, against which the flanges 24 of the tubes abut. In the embodiment shown, the conduit member is provided with a disc element 25 and a flange element 26 retaining an O-ring seal 27, of rubber or other resilient material, for fluid-sealing engagement with a discharge tube (not shown). A mass of resin potting compound 28 is disposed within the cap 21 to receive the first ends of the tubes in fluid sealing engagement, and a further mass 29 of the same compound is applied about the flanges 24 and the openings 23 to seal the opposite ends of the tubes against direct fluid flow from the space 30 surrounding the tubes into the conduit member 22. The resin potting compound may be thermosetting or thermoplastic, but must be of a material which will not react with the plastic filter film of the cartridges.

The assembly is immersed in a suitable pressure vessel enclosing the space 30, to which fluid to be filtered is supplied under pressure. The fluid is filtered through the plastic films of the tubes 20, and is removed from the assembly through the discharge tube previously referred to (not shown). It has been found that an assembly of this kind utilizing thirty-one tubes each measuring approximately one-quarter of an inch in diameter by three and a half inches in length will filter twelve gallons per minute of water under a pressure differential of 40 pounds per square inch.

It will be apparent to those skilled in the art that various changes and modifications may be made in the method and product of the invention without departing from the spirit and scope thereof; all such changes and modifications are therefore intended to be covered in the appended claims.

What we claim and desire to secure by Letters Patent of the United States is:

1. The method of manufacturing a filter supported on a perforated support, which comprises forming a thin solid coating of a base material upon the outer surface of the support and over the perforations therein, applying over the base material a plastic film-forming solution, treating the film-forming solution to convert it into a thin flexible plastic filter film having substantially transverse pores of effective diameter less than ten microns upon the outer periphery of the base material and over said perforations, and removing the base material while leaving the plastic film in situ, loosely overlying the support and the perforations, thereby producing a filter in which the film is supported against external filtration pressure by the tube and in which substantially the entire area of the film is effective to filter fluids therethrough.

2. The method recited in claim 1, in which the step of forming the plastic film is carried out by dipping the support into a film-forming solution while rotating the support about a longitudinal axis thereof at a speed to form a uniform film thereon, and converting the liquid film to a solid microporous structure.

3. The method of manufacturing a filter including a flexible microporous plastic filter film and a perforated tube of relatively rigid material, which comprises the steps of forming a thin solid coating of a base material upon at least the outer periphery of the tube and over the perforations therein, applying over the base material a plastic film-forming solution, treating the film-forming solution to convert it into the flexible microporous plastic film at least 50 microns in thickness and with pores of effective diameter less than 10 microns upon the outer periphery of the solid coating and overlying the perforations, and removing the solid coating while leaving the plastic film in situ, in peripheral location about the tube and overlying the perforations, thereby producing a filter in which the film is supported against external filtration pressure by the tube and in which substantially the entire area of the film is effective to filter fluids therethrough.

References Cited by the Examiner

UNITED STATES PATENTS

| | | | |
|---|---|---|---|
| 1,331,732 | 2/20 | Wait | 210—321 X |
| 2,106,808 | 2/38 | Murphy et al. | 18—58.7 |
| 2,254,263 | 9/41 | Bratring | 18—58.6 |
| 2,285,502 | 6/42 | Dreyfus. | |
| 2,337,575 | 12/43 | Sloan | 210—496 X |
| 2,378,700 | 6/45 | Habib | 18—58.7 |
| 2,548,353 | 4/51 | Cunningham | 264—317 |
| 2,701,392 | 2/55 | Eich | 264—317 |
| 2,930,754 | 3/60 | Stuckey | 210—500 X |

FOREIGN PATENTS

| | | |
|---|---|---|
| 482,104 | 3/38 | Great Britain. |
| 753,888 | 8/56 | Great Britain. |

ROBERT F. WHITE, *Primary Examiner.*

CARL F. KRAFFT, MICHAEL V. BRINDISI, ALEXANDER H. BRODMERKEL, *Examiners.*